(12) United States Patent
Banerjee

(10) Patent No.: US 12,038,884 B2
(45) Date of Patent: *Jul. 16, 2024

(54) LEARNING-BASED STORAGE REDUCTION IN AN OVERLAY NETWORK

(71) Applicant: Akamai Technologies, Inc., Cambridge, MA (US)

(72) Inventor: Indrajit Banerjee, Bengalura (IN)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,899

(22) Filed: Jun. 27, 2023

(65) Prior Publication Data

US 2023/0342336 A1  Oct. 26, 2023

Related U.S. Application Data

(63) Continuation of application No. 17/380,156, filed on Jul. 20, 2021, now Pat. No. 11,687,497.

(60) Provisional application No. 63/054,259, filed on Jul. 21, 2020.

(51) Int. Cl.
| | | |
|---|---|---|
| *G06F 16/00* | (2019.01) | |
| *G06F 16/14* | (2019.01) | |
| *G06F 16/182* | (2019.01) | |
| *G06F 17/16* | (2006.01) | |
| *G06N 20/00* | (2019.01) | |

(52) U.S. Cl.
CPC ........ *G06F 16/1827* (2019.01); *G06F 16/148* (2019.01); *G06F 17/16* (2013.01); *G06N 20/00* (2019.01)

(58) Field of Classification Search
CPC .......................... G06F 16/1827; G06F 16/148
See application file for complete search history.

(56) References Cited

U.S. PATENT DOCUMENTS

| | | | | |
|---|---|---|---|---|
| 7,376,716 | B2 * | 5/2008 | Dilley | H04L 67/564 |
| | | | | 711/122 |
| 10,198,532 | B2 * | 2/2019 | Christian | G06F 17/18 |
| 10,922,363 | B1 * | 2/2021 | Paiz | H04L 67/02 |
| 11,132,721 | B1 * | 9/2021 | Uthaman | G06F 16/958 |
| 11,238,061 | B2 * | 2/2022 | Dageville | G06F 9/4881 |

(Continued)

*Primary Examiner* — Noosha Arjomandi
(74) *Attorney, Agent, or Firm* — David H. Judson

(57) ABSTRACT

An overlay network is augmented to provide more efficient data storage by processing a dataset of high dimension into an equivalent dataset of lower dimension, wherein the data reduction reduces the amount of actual physical data but not necessarily its informational value. Data to be processed (dimensionally-reduced) is received by an ingestion layer and supplied to a learning-based storage reduction application that implements the data reduction technique. The application applies a data reduction algorithm and stores the resulting dimensionally-reduced data sets in the native data storage or third party cloud. To recover the original higher-dimensional data, an associated reverse algorithm is implemented. In general, the application coverts an N dimensional data set to a K dimensional data set, where K<<N. The N dimensional dataset has a high dimension, and the K dimensional dataset has a low dimension. From a data storage perspective, it is cheaper and more efficient to store the low dimensional dataset.

8 Claims, 5 Drawing Sheets

(56) References Cited

U.S. PATENT DOCUMENTS

| | | | | |
|---|---|---|---|---|
| 11,520,907 | B1* | 12/2022 | Borowiec | G06F 3/067 |
| 2004/0093419 | A1* | 5/2004 | Weihl | H04L 63/06 |
| | | | | 709/214 |
| 2013/0041873 | A1* | 2/2013 | Laursen | G06F 16/1827 |
| | | | | 707/E17.107 |
| 2018/0222043 | A1* | 8/2018 | Trovero | G06F 16/285 |
| 2019/0311301 | A1* | 10/2019 | Pyati | G06F 16/901 |
| 2019/0361917 | A1* | 11/2019 | Tran | H04W 12/108 |
| 2021/0157312 | A1* | 5/2021 | Cella | G01M 13/045 |
| 2021/0342310 | A1* | 11/2021 | Yang | G06F 7/5443 |
| 2022/0083657 | A1* | 3/2022 | Karr | G06F 21/64 |
| 2022/0121884 | A1* | 4/2022 | Zadeh | G06V 10/764 |
| 2023/0061280 | A1* | 3/2023 | Rohrkemper | G06N 20/00 |
| 2023/0098602 | A1* | 3/2023 | Cella | G06Q 10/087 |
| | | | | 700/248 |

* cited by examiner

- ACTUAL DATA SET

WORKSPACE $ wc -l data.txt 10000 data.txt

WORKSPACE $ head -l data.txt 30 2019/11/07:10:50:00 591 1546384 0 3 1321919 187986 1509905 0000000021000330000000000000000 1323231 0000000000000 000000000 162 0 429 00000000000000000000000000000000300000000000000 591 1546384 0 3 1321919 187986 1509905 000 0000210003300000000000000000 1323231 00000000000000000000000000000 162 0 429 0000000000000000000000000 000003000000000000000 61 2 103868 104359 000 63 1010100000 13 1000000100000000001000000000100000000000 00 61 2 103868 104359 000 63 1010100000 13 1000000100000000001000000000100000000000

NUMBER OF LINES TO BE PROCESSED:    10000
NUMBER OF FIELDS IN EACH LINE:    338

REDUCED DATA:

1573015000 $ head -1 7290/reduced_data.txt
-2479181 -3616674 683130 -214831 -621891 -98612 -36840 -13638 -1820 2040 1398 -641 -3337 -1670 -295 1012 9 819 -40 -65 790 9 -3 -27 88 39 17 4 -6 4 7 -5 0 -6 -2 -1 0 0 0 0 -4 1574233658

NUMBER OF LINES TO BE PROCESSED:    10000
NUMBER OF FIELDS IN EACH LINE:   60
% OF REDUCTION:           82%

FIG. 5

LEARNING-BASED STORAGE REDUCTION IN AN OVERLAY NETWORK

BACKGROUND

Technical Field

This application relates generally to optimizing data storage in a distributed computing network environment.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

An overlay network service provider (e.g., Akamai Technologies, Inc., of Cambridge, Massachusetts) processes and stores a large amount of data. Thus, for example, a typical CDN includes a distributed data collection system that collects usage and other data from the CDN edge servers, aggregates that data, and passes that data to other back-end systems to facilitate monitoring, logging, alerts, billing, management and other operational and administrative functions. Datasets generated by these processes are complex and typically comprise an interrelated set of data items. Thus, for example, one dataset may be log data generated by a CDN edge server, with each logline identifying a large set of interrelated data, e.g., details regarding a client machine-to-edge server connection, timing data, IP address data, request object, bytes delivered, etc. As such, the data collection system (as well as other CDN systems) generate huge amounts of data, with such data being general of high-dimension in the sense that a particular dataset comprises multiple interrelated data items. This data collection system may comprise a large number of machines located in many networks around the world. Such providers may also leverage third party cloud-based storage platforms to process and store this data. Whether the data is stored in the overlay or in a third party data store, the "cost" of such storage typically depends on the amount of data involved. Sustaining a large volume of data is costly both in terms of processing (CPU usage) and storage. Memory and RAM overflow leads to the creation of data backlogs, and the cascading effects of such issues can lead to delays in real-time reporting that is utilized by the provider both for customer billing and internal analytics.

There remains a need to provide for improved techniques to manage the storage of large datasets generated by an overlay network provider.

BRIEF SUMMARY

An overlay network (either natively or with cloud support) is augmented to provide more efficient data storage. The basic notion is to process a dataset of high dimension into an equivalent dataset of lower dimension, wherein the data reduction reduces the amount of actual physical data but not necessarily its informational value. Data to be processed (dimensionally-reduced) is received by an ingestion layer and supplied to a learning-based storage reduction application that implements the data reduction technique. The application applies a data reduction algorithm and stores the resulting dimensionally-reduced data sets in the native data storage or third party cloud. To recover the original higher-dimensional data, an associated reverse algorithm is implemented. In general, the application coverts an N dimensional dataset to a K dimensional dataset, where $K \ll N$. As used herein, the N dimensional dataset has a high dimension, and the K dimensional dataset has, relative to the N dimensional dataset, a lower (low) dimension. From a data storage perspective, it is cheaper and more efficient to store the low dimensional dataset.

The application preferably leverages Principal Component Analysis (PCA) to facilitate the data reduction. The algorithm is applied on an appropriate dataset of interest. Preferably, the reduced dataset that results is stored along with its eigen properties (namely, an eigenvector, corresponding to a real nonzero eigenvalue) in a correct time window segment, such that the reduced data set can be reverted back to its original form efficiently when a query for a relevant data frame (that includes the reduced dataset) is received. Reverting back to the original data (using the reverse algorithm described above) from the reduced property is enabled using the eigen property of the data segment for a particular time window. In this approach, preferably the algorithm segments the raw input data frame into different time buckets, performs a data conversion using PCA, and then stores the resulting reduced data along with its eigen property in the correct time bucket. When a query for a data frame is received, the system identifies the bucket, retrieves the information from the bucket, and converts the reduced data to its original data frame using the reversing algorithm.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 5 depicts how the algorithm of this disclosure produces a reduced dataset from an actual dataset.

DETAILED DESCRIPTION

Figure 1:
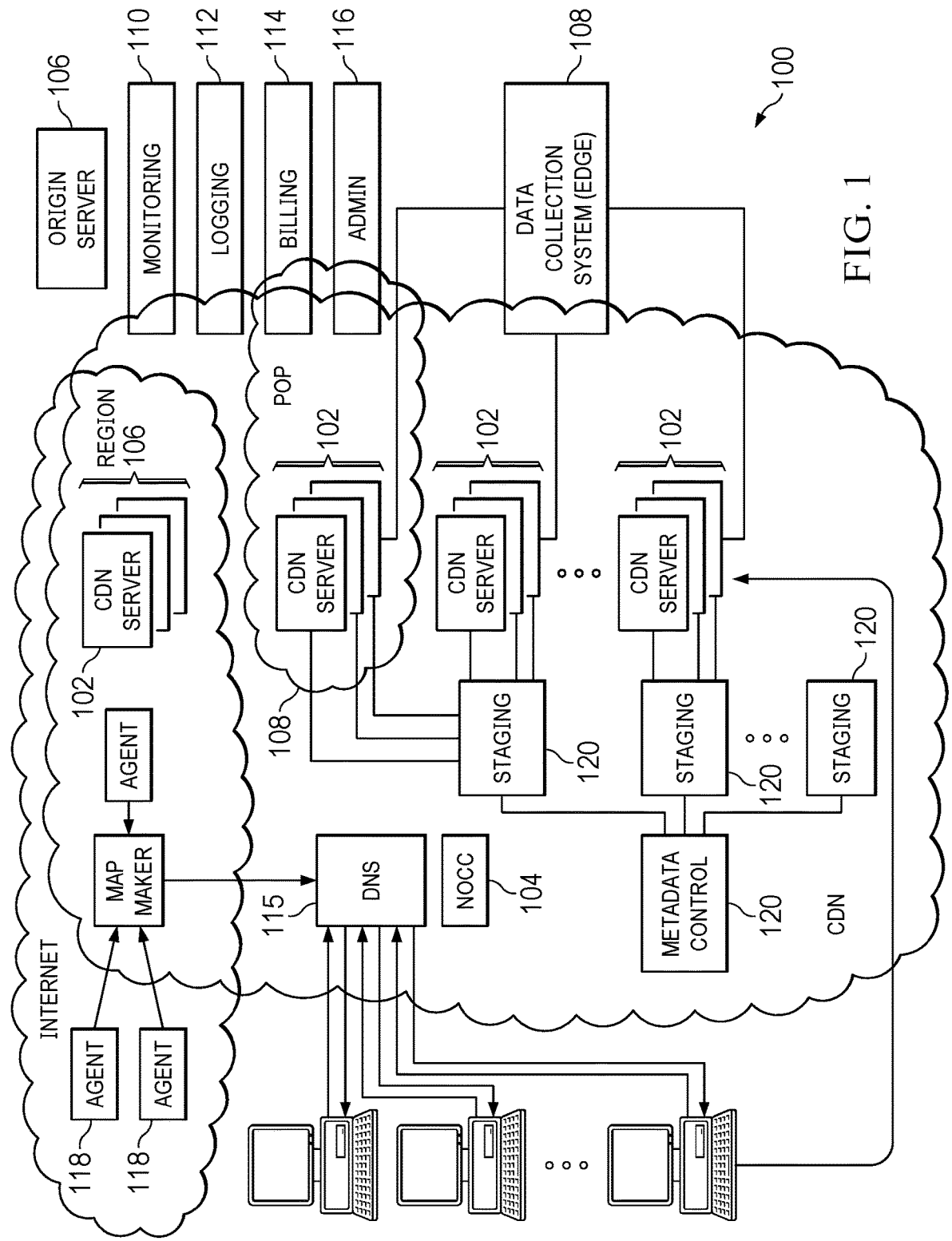
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
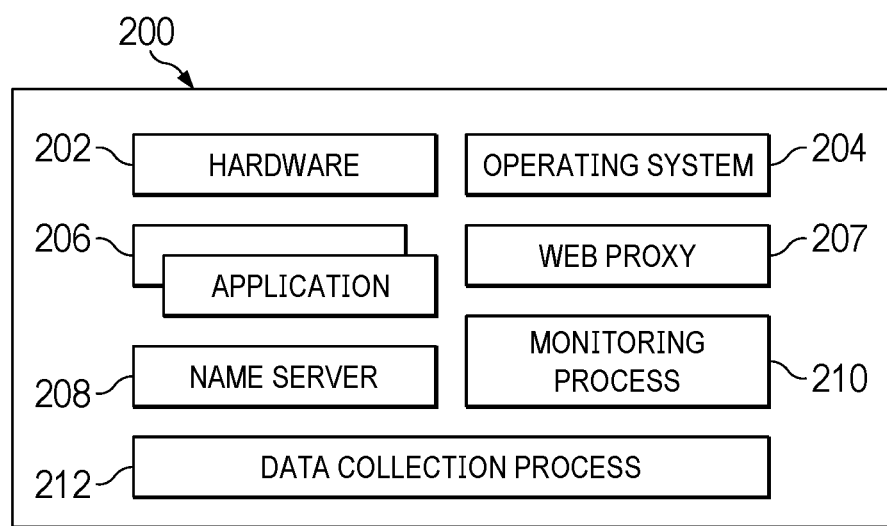
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers. This may include operating secure edge regions comprising edge servers located in locked cages that are monitored by security cameras.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

As used herein, an "edge server" refers to a CDN (overlay network) edge machine or server process used thereon.

Preferably, the platform as described above also supports a machine learning system. As is known, ML algorithms iteratively learn from the data, thus allowing the system to find hidden insights without being explicitly programmed where to look. ML tasks are typically classified into various categories depending on the nature of the learning signal or feedback available to a learning system, namely supervised learning, unsupervised learning, and reinforcement learning. In supervised learning, the algorithm trains on labeled historic data and learns general rules that map input to output/target. The discovery of relationships between the input variables and the label/target variable in supervised learning is done with a training set, and the system learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, linear regression, logistic regression, naive Bayes, and neural networks (NN). Formally, a NN is a function $g: X \rightarrow Y$, where X is an input space, and Y is an output space representing a categorical set in a classification setting (or a real number in a regression setting). For a sample x that is an element of X, $g(x)=f_L(F_{L-1}(\ldots((f_i(x))))$. Each $f_i$ represents a layer, and $F_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

In unsupervised machine learning, the algorithm trains on unlabeled data. The goal of these algorithms is to explore the data and find some structure within. The most widely used unsupervised learning algorithms are Cluster Analysis and Market Basket Analysis. In reinforcement learning, the algorithm learns through a feedback system. The algorithm takes actions and receives feedback about the appropriateness of its actions and based on the feedback, modifies the strategy and takes further actions that would maximize the expected reward over a given amount of time.

The following provides additional details regarding supervised machine learning. As noted above, supervised learning is the machine learning task of inferring a function from labeled training data. The training data consist of a set of training examples. In supervised learning, typically each example is a pair consisting of an input object (typically a vector), and a desired output value (also called the supervisory signal). A supervised learning algorithm analyzes the training data and produces an inferred function, which can be used for mapping new examples. An optimal scenario allows for the algorithm to correctly determine the class labels for unseen instances. This requires the learning algorithm to generalize reasonably from the training data to unseen situations. For supervised learning, the following steps are used. An initial determination is what kind of data is to be used as a training set. The training set is then gathered. In particular, a set of input objects is gathered and corresponding outputs are also gathered, either from human experts or from measurements. Then, an input feature representation of the learned function is determined. In this approach, typically the input object is transformed into a feature vector, which contains a number of features that are descriptive of the object. The structure of the learned function and corresponding learning algorithm are then determined. For example, support vector machines or decision trees may be used. The learning algorithm is then run on the gathered training set. Some supervised learning algorithms require a user to determine certain control parameters. These parameters may be adjusted by optimizing performance on a subset (called a validation set) of the training set, or via cross-validation. The accuracy of the learned function is then evaluated. After parameter adjustment and learning, the performance of the resulting function is measured on a test set that is separate from the training set.

Other enabling technologies for typical machine learning algorithms include, without limitation, vector autoregressive modeling (e.g., Autoregressive Integrated Moving Average (ARIMA)), state space modeling (e.g., using a Kalman filter), a Hidden Markov Model (HMM), recurrent neural network (RNN) modeling, RNN with long short-term memory (LSTM), Random Forests, Generalized Linear Models, Extreme Gradient Boosting, Extreme Random Trees, and others. By applying these modeling techniques, new types of features are extracted, e.g., as follows: model parameters (e.g., coefficients for dynamics, noise variance, etc.), latent states, and predicted values for a next couple of observation periods.

Learning-Based Storage Reduction in an Overlay Network

With the above as background, the techniques of this disclosure are now described. By way of additional background, the following linear algebra concepts provide further context for the disclosed storage management techniques.

Figure 3:
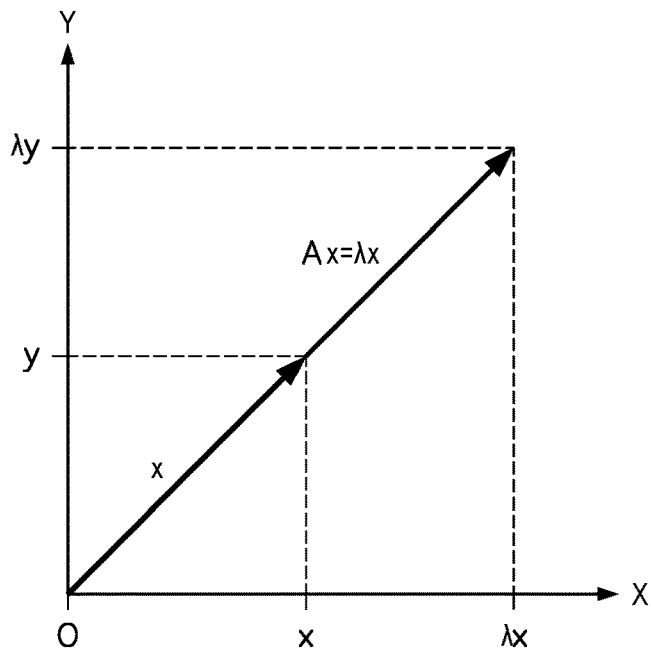
FIG. 3 depicts a geometric representation of an eigenvector.

An eigenvector or characteristic vector of a linear transformation is a nonzero vector that changes at most by a scalar factor when that linear transformation is applied to it. In linear algebra, there is a direct correspondence between n-by-n square matrices and linear transformations from an n-dimensional vector space into itself, given any basis of the vector space. For this reason, in a finite-dimensional vector space, it is equivalent to define eigenvalues and eigenvectors using either the language of matrices or the language of linear transformations. Geometrically, and as depicted in FIG. 3, an eigenvector, corresponding to a real nonzero eigenvalue, points in a direction in which it is stretched by the transformation, and the eigenvalue is the factor by which it is stretched. If the eigenvalue is negative, the direction is reversed. In a multidimensional vector space, the eigenvector is not rotated.

Principal component analysis (PCA) is a statistical procedure that uses an orthogonal transformation to convert a set of observations of possibly correlated variables (entities each of which takes on various numerical values) into a set of values of linearly uncorrelated variables called principal components. This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors (each being a linear combination of the variables and containing n observations) are an uncorrelated orthogonal basis set.

It is known to use PCA to find hidden correlation between datasets, and this property is leveraged herein. By way of additional background, a typical PCA algorithm works as follows. A d-dimensional dataset represented the data to be processed through the algorithm is first standardized. A covariance matrix is then constructed. The covariance matrix is then decomposed into its eigenvectors and eigenvalues. The eigenvalues are then sorted by decreasing order to rank the corresponding eigenvectors. The algorithm then selects k eigenvectors that correspond to the k largest eigenvalues, where k is the dimensionality of the new feature subspace (k≤d). A projection matrix W is then constructed from the "top" k eigenvectors. Then, the d-dimensional input dataset X is transformed using the projection matrix W to obtain the new k-dimensional feature subspace.

Figure 4:
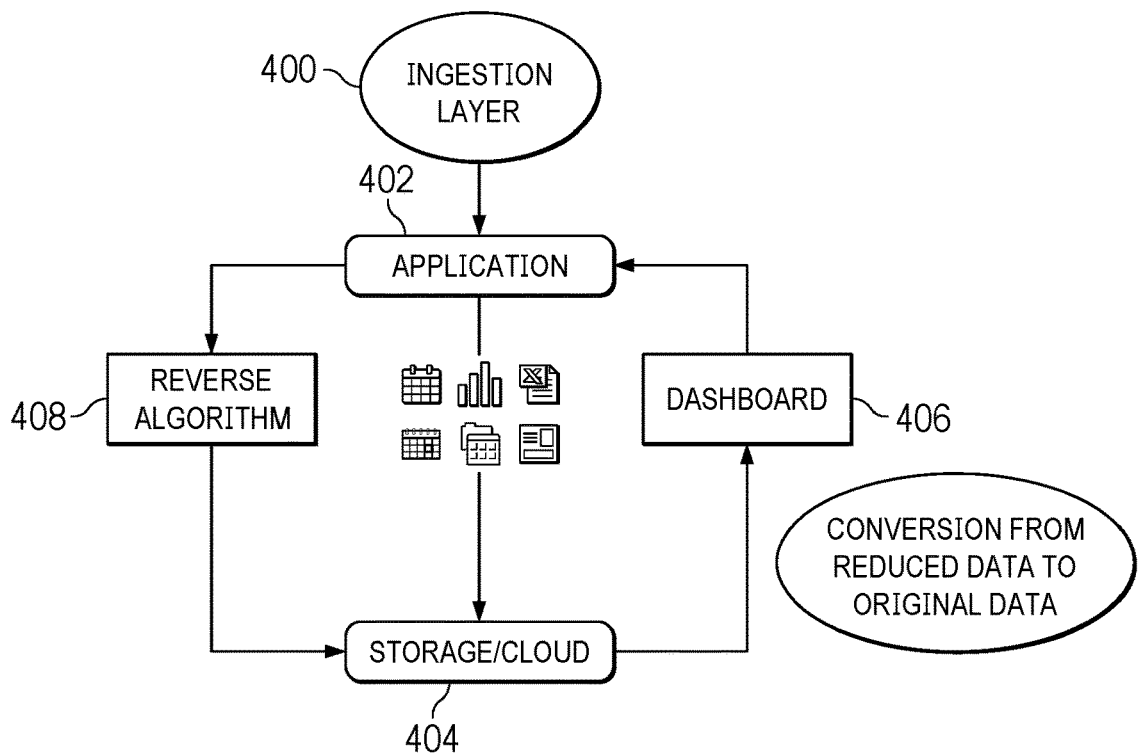
FIG. 4 depicts a representative data storage and recovery system according to an embodiment of this disclosure.

Referring now to FIG. 4, the techniques of this disclosure may be implemented in an overlay network as depicted. Data to be processed (dimensionally-reduced) is received by an ingestion layer 400 and supplied to a learning-based storage reduction application 402 that implements the subject technique. The application applies a data reduction algorithm and stores the resulting dimensionally-reduced data sets in the native data storage or third party cloud 404. A web-based GUI dashboard 406 may provide reporting and other relevant information about the process. To recover the original higher-dimensional data, an associated reverse algorithm 408 is provided.

In general, the learning-based storage application coverts an N dimensional data set to a K dimensional data set, where K<<N. As used herein, and as noted above, the N dimensional data set has a high dimension, and the K dimensional data set has a low dimension. From a data storage perspective, it is cheaper and more efficient to store the low dimensional data set. Given an overlay network input data stream, according to this disclosure the following PCA-based algorithm is then implemented.

At step (1), the dataset is created. In particular, an input dataset is segmented into two sets $X_{train}$ and $X_{cv}$, wherein $X_{train}$ is production data (e.g., from the overlay network distributed data collection system), and $X_{cv}$ is a cross-validation dataset. The pseudocode corresponding to step (1) is as follows:

set $X_{train}, X_{test}, y_{train}, y_{test}$=train$_{[test_{split}]}$(X,y,test$_{size}$=0.2, stratify=y,random$_{state}$=0).

At step (2) of the algorithm, one or more features are standardized. The corresponding pseudocode for step (2) is as follows: sc=StandardScaler( ), $X_{[train_{std}]}$=sc.fit$_{[transform(x_{train})]}$.

At step (3), a covariance matrix is constructed according to the following:

$$\sigma_{jk} = \frac{1}{n}\sum_{i=1}^{n}(x_j^{(i)} - \mu_j)(x_k^{(i)} - \mu_k).$$

The corresponding pseudocode for step (3) is as follows: cov$_{mat}$=np.cov($X_{train_{std}T}$).

At step (4), eigen$_{vals}$ and eigen$_{vecs}$ pairs are constructed.eigen The corresponding pseudocode for step (4) is as follows: eigen$_{vals}$,eigen$_{vecs}$=np.linalg.eig$_{cov_{mat}}$.

At step (5), threshold eigenvalues are obtained. The corresponding pseudocode for step (5) is as follows:

$$tot = sum_{eigen_{vals}} \quad (i)$$

$$var\_exp = \left[\left(\frac{i}{tot}\right) \text{ for } i \text{ in sorted }(eigen_{vals}, \text{reverse} = \text{True})\right], \text{ and} \quad (ii)$$

$$cum_{var_{exp}} = np.cumsum(var_{exp}). \quad (iii)$$

At step (6), the algorithm sets a Threshold of % correctness for eigen_val. In one embodiment, this threshold is set at 99%, although this is not a limitation. This leads to the value of reduced component numbers.

At step (7), the algorithm coverts the $N^{th}$ dimension to the reduced K dimension, and the result (the reduced components) are stored in final storage. The corresponding pseudocode for step (7) is as follows: $X_{PCA}$=pca.transform($X_{train}$) [:,:nComp].

At step (8), and although not required, the mean component of the same entity may be stored: The corresponding pseudocode for step (8) is as follows: mu=np.mean($X_{train}$, axis=0).

At step (9), and although not required, the transposed eigenvector component of the same entity may be stored. The corresponding pseudocode for step (9) is as follows: eigen$_{trans}$=pca.components$_{[:ncomp,:]}$.

FIG. 5 depicts an example of an actual dataset and how application of the above-described algorithm generates a reduced dimension dataset. As this example illustrates, the actual data set includes 338 fields, whereas the reduced dataset includes just 60 fields, representing an 82% reduction in size.

Figure 6:
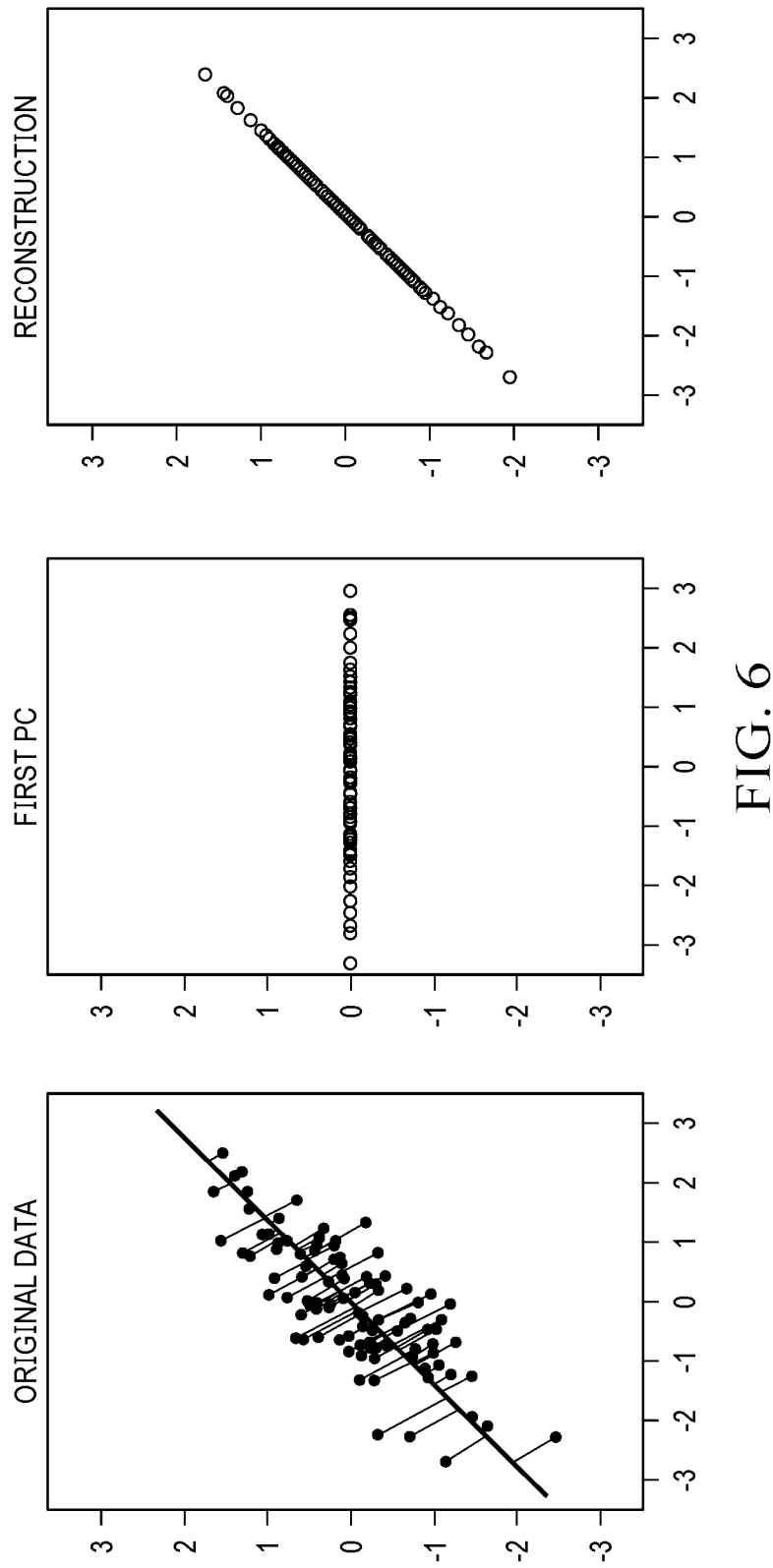
FIG. 6 depicts the PCA operation on a dataset.

In the above-described process, PCA performs an orthogonal conversion of data fields (in the high-dimension dataset) and finds the correlation(s) amongst hidden properties of the data items therein. In particular, PCA computes eigenvectors of the covariance matrix ("principal axes") and sorts them by their eigenvalues (amount of explained variance). The centered data is then projected onto these principal axes to yield principal components ("scores"). For the purposes of dimensionality reduction, preferably only a subset of principal components is maintained. To provide a concrete example, let $X_{raw}$Xraw be the $n$ xpnxp data matrix with $n$ n rows (data points) and $p$ p columns (variables, or features). After subtracting the mean vector $u$u from each row, a centered data matrix $X$ X is obtained. Let $V$ V be the $p$ xkpxk matrix of some $k$ k eigenvectors; these would most often be the $k$ k eigenvectors with the largest eigenvalues. Then, the $n$ xknxk matrix of PCA projections ("scores") is given by $Z$= $X$ $Y$Z=XV. FIG. 6 depicts this operation. In particular, the first subplot shows some centered data and its projections on the first principal axis. The second subplot shows only the values of this projection; as can be seen, the dimensionality has been reduced from two to one.

Data Recovery

As noted above, the reverse algorithm may be used to recover the original dataset whose dimensionality has been reduced by the PCA algorithm. In one embodiment, a reverse algorithm works as follows:

PCA reconstruction=PC scores×EigenvectorsT+
MeanPCA reconstruction=PC scores×EigenvectorsT+Mean With reference to FIG. 6, note that one can go directly from the first subplot to the third one by multiplying $X$ X with a projection matrix, in this example: $V$ $V$TVVT. If all $p$p eigenvectors are used, then $V$ $V$TVVT is the identity matrix (no dimensionality reduction is performed, hence "reconstruction" is perfect). If only a subset of eigenvectors is used, it is not the identity matrix. This operation works for an arbitrary point $z$ z in the principal components (PC) space; the point can be mapped to the original space via $\hat{x}$ = $V$ $V$T$\hat{x}$=zVT. In the PCA process, it may be desired to discard (remove) one or few of the leading PCs and to keep the rest, instead of keeping the leading PCs and discarding the rest. In this case, all the formulas stay the same, but $V$ V consists of all principal axes except for the ones to discard. In other words, $V$ V should always include all PCs that are to be kept.

When PCA is done on a correlation matrix (and not on covariance matrix), the raw data $X_{raw}$ is not only centered by subtracting $u$ but also scaled by dividing each column by its standard deviation. In this case, to reconstruct the original data, one needs to back-scale the columns of XX with the deviation, and only then to add back the mean vector $u$. Representative pseudocode for the above is as follows: (i) real$_{data}$=np.dot(data$_{mat}$,eigen$_{mat}$), (ii) real+ data+=mu$_{mat}$, (iii) $z = \hat{x} \mathbb{V} T\hat{x} = zVT$, (iv) Eigen$_{mat}$=Transpose(eigen$_{vector\ of\ covariance\ of\ real\ data}$), and (v) Data$_{mat}$=reduced data matrix.

Variants

As a variant embodiment, the system may also implement a learning-based model of eigenvalue and eigenvector prediction. In particular, in the approach described above the PCA process computes eigen pairs for each data set entry for conversion (to the reduced data set) and further uses the transpose matrix of the same to reverse the mechanism. As a variant, the learning-based algorithm operates in a batch process on the dataset (in a backend process) and creates a model of predictive eigenvalues so that the computation that occurs during actual ingest of the data stream may be carried out faster. A further variant is to include a learning model that facilitates optimization of data fields in a dataset after establishing the correlation. Further, similar types of modeling may be leveraged in processing layers (e.g., in a MapReduce architecture) that process data frames and streams even before storing the data in storage.

Preferably, the type of model building described herein is a continuous process, with machines (all across the overlay network) generating models and potentially sharing the relevant observations. As such, there is no requirement of a centralized control and no requirement for a "central" model that is created and distributed to the other machines; rather, throughout the overlay network different subsets of machines are building/collaborating with one another such that many "variants" or "versions" of the model are being derived and potentially shared by the various subsets. Preferably, there is no central control over a version of a model; rather, each local machine preferably has its own version of the model. In this type of ad hoc approach, the specific topology of the overlay (or portions thereof) is not limiting; rather, the model building preferably is carried out in parallel (across nodes throughout the network), with a particular model variant/version being associated with a subset of the machines of the overall overlay network. The result is a highly scalable collaborative learning system.

As a skilled person will appreciate, the technique leverages PCA, but differs in the following respects. The algorithm is applied on an appropriate dataset of interest. Preferably, the reduced dataset that results is stored along with its eigen properties in a correct time window segment, such that the reduced data set can be reverted back to its original form efficiently when a query for a relevant data frame (that includes the reduced dataset) is received. Reverting back to the original data (using the reverse algorithm described above) from the reduced property is enabled using the eigen property of the data segment for a particular time window. In this approach, preferably the algorithm segments the raw input data frame into different time buckets, performs a data conversion using PCA, and then stores the resulting reduced data along with its eigen property in the correct time bucket. When a query for a data frame is received, the system identifies the bucket, retrieves the information from the bucket, converts the reduced data to its original data frame using the reversing algorithm. The reverse conversion is lossless. The algorithm can be generalized for any type of data, and it does not depend upon any kind of data format, and any kind of data can be fed to the system to get the reduced property. The only constraints of the approach are that the data stream needs a timestamp as a property to segment the data to different buckets.

The techniques described above are not limited to the ingest layer, the application (including the reverse algorithm) being an edge or other server within an overlay network; thus, the above methods should be generalized with respect to any overlay network (or supporting cloud) computing entity (system, device, machine, program, process, execution thread, etc.).

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the model building and data storage functionality is implemented in an application layer solution, although this is not a limitation.

The functionality may be implemented with other application layer protocols besides HTTP and HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server. There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

There is no limitation on the type of computing entity that may implement the functionality described herein. Any computing entity (system, machine, device, program, process, utility, or the like) may be used. As also noted, the machine or process that builds the learning model may be co-located with other such machines or processes, or otherwise sufficiently close so that the knowledge obtained by the other machines or processes can be incorporated usefully in the learning model.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The technique for learning-based data storage herein (when applied, as has been described) provides for an improvement in another technology or technical field, namely, overlay networking (content delivery) systems. Prior art overlay networking does not incorporate such data storage leverage the data dimension reduction algorithms as described, let alone to control/manage overlay network data storage.

An edge machine/process operating any aspect of the described technique may exchange information (e.g., its ML model, or portion thereof) with a peer machine/process using any group-based or direct peer-to-peer based communication mechanism, including conventional HTTPS-based request and response, serialization-based request and response, etc. and such data sharing may be carried out over multicast, unicast or the like. Machines/processes may communicate with one another over wired and/or wireless connections. One particular technique that may be used to share models may use existing WAN and/or LAN infrastructure in the overlay network that is used for communicating other control information and data between and among edge server machines. Of course, the nature of the communication will depend on the type of model being built.

Models may be updated periodically, continuously, synchronously, asynchronously, on-demand, or in response to a given event, occurrence or trigger. From a temporal perspective, the steady state may be short, medium or long term.

There is no limitation on the type of learning or knowledge-based model that is implemented to facilitate the data reduction and storage.

Particular machines/processes that implement the machine learning and share their knowledge to create emergent behavior according to the technique herein may be of any type including, without limitation, edge network computing nodes (which are typically rack-mounted in network-accessible data centers), Internet-of-Things (IoT) devices, cloud infrastructure-based computing nodes and resources, virtualized computing nodes, and the like.

The particular geographic and/or network extent of the model generation and use is not intended to be limiting.

Local data collection techniques (for supporting local model building) include, without limitation, active and passive data collection, data traffic monitoring, packet inspection, application layer-based, operating system kernel-based, and otherwise.

There may be many different types of machine learning techniques that may be used to facilitate data ingest, dimension reduction and storage, and more than one technique may be used by given subsets of edge machines that are cooperating or collaborating in this manner. The nature of the data storage across nodes will depend on the type of model being built. In another embodiment, neural networks are used for the learning. Neural networks here may perform in-band learning, or out-of-band learning. In-band learning involves keeping track of pieces of interesting data (e.g., anomalies), and then gossiping this data to the nearby nodes. In out-of-band learning, the neural network comprises a set of weights (floating point numbers over which various mathematical operations are performed), and it is the set of weights that are shared to facilitate the collaboration. To this end, t receiving node would take the weights received and incorporate them in its weight matrix/vector, or the like. Another approach to training a neural network is to create a trained lightweight model (in the manner described) and then share it to a subset of the other nodes.

Machines herein may operate as learners, which learn in real-time using streamed data, or off-line learners, which learn by training over and over on a single batch of data. Preferably, a node is a life-long learner, which is a node that becomes smarter the longer it operates in this collaborative manner.

The problem(s) being modeled by a particular model may be stationary or non-stationary.

Some overlay network nodes may use the described technique, while certain other nodes may be configured not to use the technique. A given node may provide this functionality only at certain times, or at certain times of day. A particular node may be managed by an overlay network configuration to provide a model in association with a particular constraint, e.g., a customer control, a domain, or the like.

What is claimed is as follows:

1. A computer program product in a non-transitory computer-readable medium, the computer program product comprising program code executed by at least one hardware processor, the program code configured to:

apply a principal components analysis to first data having a first dimensionality to generate second data having a second dimensionality, the second dimensionality being less than the first dimensionality but without information loss, and wherein the principal components analysis utilizes an associated covariance matrix that is decomposable into a set of eigenvectors and associated eigenvalues, and wherein an eigenvector corresponds to a real nonzero eigenvalue;

store the second data along with its eigen properties represented by the set of eigenvectors and associated eigenvalue; and responsive to receipt of a query, recovering the first data from the second data by using the eigen properties to convert the second data back to the first data; and returning the first data in response to the query.

2. The computer program product as described in claim 1 wherein the first data is received as a time-based data stream.

3. The computer program product as described in claim 2 wherein the time-based data stream has a set of time windows, and wherein a portion of the second data along with its eigen properties is associated with a given time window of the set of time windows.

4. The computer program product as described in claim 1 wherein the principal components analysis identifies one or more correlations between or among hidden properties of the first data and the second data.

5. The computer program product as described in claim 1 wherein the first data is recovered from the second data using a transpose matrix.

6. The computer program product as described in claim 1 further including creating a model of predictive eigenvalues.

7. The computer program product as described in claim 6 further including using the model of predictive eigenvalues during application of the principal components analysis to accelerate an ingest of the first data.

8. The computer program product as described in claim 6 wherein the model of predictive eigenvalues is generated continuously.

* * * * *